(12) United States Patent
Araujo

(10) Patent No.: US 6,318,938 B1
(45) Date of Patent: Nov. 20, 2001

(54) ASSEMBLY AND SYSTEM FOR REMOVABLY LOCKING A PALLET TO A SUPPORTING SURFACE

(75) Inventor: Luis Araujo, Hialeah Gardens, FL (US)

(73) Assignee: Aymos Aircraft Electronic Engineering, Inc., Miami, FL (US)

( * ) Notice: Subject to any disclaimer, the term of this patent is extended or adjusted under 35 U.S.C. 154(b) by 0 days.

(21) Appl. No.: 09/517,110

(22) Filed: Mar. 7, 2000

(51) Int. Cl.$^7$ ........................................ B60P 7/08
(52) U.S. Cl. .................... 410/79; 410/77; 410/92
(58) Field of Search .................. 410/77, 78, 79, 410/80, 69, 92, 94, 95, 105; 244/118.1, 137.1; 248/500, 503

(56) References Cited

U.S. PATENT DOCUMENTS

| | | | |
|---|---|---|---|
| 4,349,302 | * 9/1982 | Ferguson, Jr. | 410/69 |
| 4,557,648 | * 12/1985 | Koch et al. | 410/78 |
| 4,583,896 | * 4/1986 | Vogg et al. | 410/69 |
| 5,112,173 | * 5/1992 | Eilenstein et al. | 410/79 |
| 5,433,564 | * 7/1995 | Sundseth | 410/77 |
| 5,486,077 | * 1/1996 | Nutting | 410/69 |
| 5,573,359 | * 11/1996 | Moradians | 410/69 |
| 5,816,758 | * 10/1998 | Huber | 410/77 |
| 5,871,317 | * 2/1999 | Huber et al. | 410/79 |

* cited by examiner

*Primary Examiner*—Stephen T. Gordon
(74) *Attorney, Agent, or Firm*—Malloy & Malloy, P.A.

(57) ABSTRACT

An assembly and associated system for assuring that one or more freight or cargo carrying pallets are secured to a supporting surface in the cargo or storage area of an aircraft. The assembly including a plurality of spaced apart tracks fixedly mounted to the supporting surface, and disposed in underlying, supporting relation to the pallets. A plurality of locking assemblies, are provided and structured to removably but lockingly engage the tracks at strategic positions immediately adjacent peripheral portions of the pallets. Each of the locking assemblies are selectively oriented into a locked position which retains and lockingly secures the pallets in a preferred position relative to the plurality of tracks on which they are disposed. A switching assembly is provided and includes a plurality of proximity switches disposed in the tracks in spaced apart relation along the respective lengths thereof, the switching assembly also including an activating member secured to each of the locking assemblies, and disposable in activating relation to at least one switch when the locking assemblies are in the locked position. An indicator assembly is thereby activated, such that the location of each locking assembly, as well as the orientation thereof in a locked position is clearly indicated, thereby eliminating the possibility of one or more pallets being loaded on an aircraft in an unsecured manner.

30 Claims, 3 Drawing Sheets

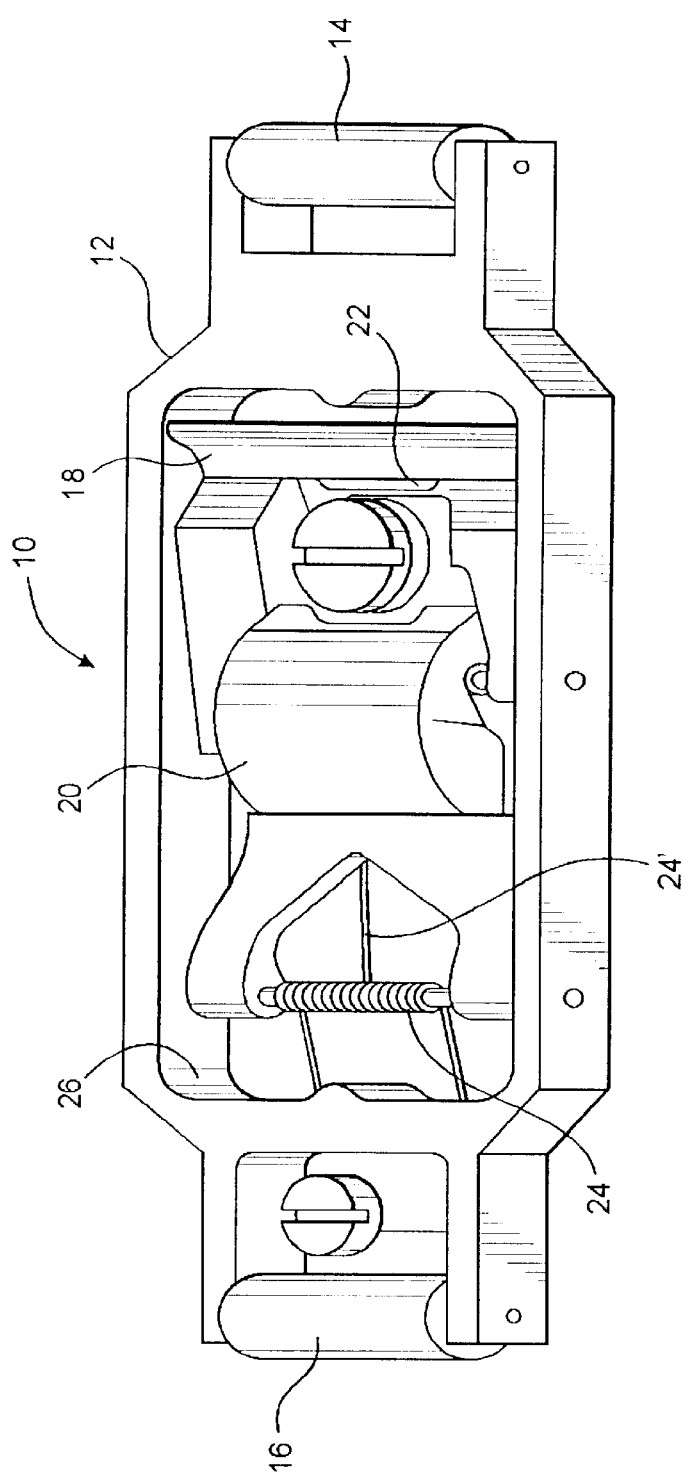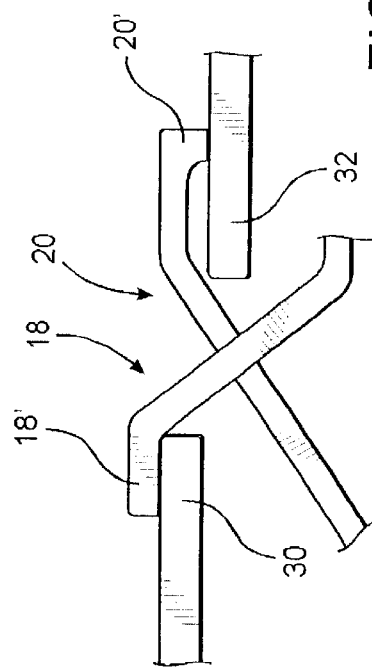

ASSEMBLY AND SYSTEM FOR REMOVABLY LOCKING A PALLET TO A SUPPORTING SURFACE

BACKGROUND OF THE INVENTION

1. Field of the Invention

The present invention relates to a locking assembly and associated system structured to securely anchor one or more cargo or freight pallets to a floor or like supporting platform primarily, but not exclusively within the cargo area of a commercial aircraft. A switching assembly and an interconnected indicator assembly are cooperatively disposed and structured to indicate the location of each of the plurality locking assemblies used to anchor the one or more pallets in an intended position on a track assembly, to which the locking assemblies are connected, as well as provide clear visual indication as to whether each of the locking assemblies is oriented in a locked position or an unlocked position.

2. Description of the Related Art

The transporting of various types of freight, cargo etc., on aircraft is an ever increasing segment of the transportation industry. The increased popularity of air freight as a means for transporting cargo is at least partially fostered by the demand for reducing the time of transport and delivery of a wide range of cargo, freight, packages, etc., to various locations throughout the world. To at least some extent this demand has been satisfied by various overnight delivery companies which are dedicated to the air transport of a large variety of different types of freight, generally in the form of relatively small packages, in a minimal amount of time, and at a substantially reasonable cost. In addition, commercial airlines which are primarily dedicated to the transportation of passengers also reserve a significant portion of their passenger aircraft to the storage and transport of cargo. While air transportation of freight is becoming less expensive, significantly reducing transport time, and includes other distinct advantages, there is a potential for serious problems developing which are directly associated with the loading and handling of large quantities of freight on commercial aircraft.

More particularly, the performance of an aircraft during a flight, as well as take-off and landing procedures, is greatly dependent upon the stability of the aircraft. In turn, aircraft stability is, at least to a large part, directly related to the substantially equal or at least balanced distribution of the weight of the load which the aircraft carries. The criticality of a balanced weight distribution is at least partially evidenced by the fact that the tanks used for the containment of liquid fuel are located throughout both wings, as well as other parts of the aircraft, in a substantially evenly distributed manner. In addition, the distribution of liquid fuel as it is being consumed also occurs in a manner which maintains the equilibrium of the aircraft. Therefore, it is extremely important that freight, depending upon its size and weight, must be loaded in the appropriate cargo area of the aircraft in a manner which distributes the weight of such cargo in a predetermined, balanced manner and maintains it in that manner.

Typically, freight intended to be transported on an aircraft is first mounted on one or more pallets which may vary in dimension, but which incorporate a substantially standardized configuration and overall structure. These pallets are intended to be removably but securely anchored to the floor or other supporting platform within the aircraft in a manner which assures that the pallets, as well as the freight or cargo supported thereon will not shift or become inadvertently dislodged from their original, intended position when loaded. The secure anchoring of the freight supporting pallets in their intended position within the aircraft, as loaded, is particularly important due to the relatively severe orientations the aircraft may have to assume during landings, take-offs and unusual flight conditions. Is obvious that the positioning or orientation of the aircraft in those unusual or severe attitude orientations places a significant strain on the structural facilities which serve to secure the plurality of pallets to the supporting surface or platform. In order to overcome these severe forces or strains, it is imperative that the person responsible for securing the freight within the cargo area of an aircraft be assured that the pallets are in fact locked into secured engagement in their intended positions.

In the airfreight industry, the anchoring of the freight supporting pallets within an aircraft is accomplished through a system which includes a track assembly comprising a plurality of spaced apart tracks extending along the length of the support surface or platform on which the pallets are to be secured. Positioned, along the track are a plurality of locking assemblies each of which is structurally adapted to be easily attached, at an appropriate location, to one or more of the plurality of tracks, in a manner which securely engages the corresponding pallets and maintains the pallets in their intended position to accomplish balance or equal distribution of the weight of the entire load of the freight within the aforementioned cargo area of the aircraft. The aforementioned system for securing the plurality of pallets to the supporting surface in the cargo area of aircraft has proven to be reliable and efficient, assuming that each of the aforementioned locking assemblies are in fact disposed or oriented in their locked position and in secured, interconnecting relation between the aforementioned track assembly and the plurality of pallets supported thereon.

However, in order to assure the stability of the aircraft and the safety of the crew and/or passenger thereon, it is a necessity that each of the aforementioned locking assemblies be individually checked to verify that they are disposed in the aforementioned locked position. Due to the large number of such locking assemblies, it is difficult for even the most responsible personnel to examine each of the locking assemblies to assure that they are properly oriented in their locked position. As a result, it is not uncommon for one or more of the large number of locking assemblies to be properly positioned relative to the track assembly and adjacent pallets, but be inadvertently allowed to remain in the unlocked position. Naturally, one can appreciate the potentially catastrophic result which could occur if a large number of such locking assemblies were allowed to remain in their unlocked position, particularly if the aircraft encounters severe weather conditions or is required to assume an angled orientation or attitude during the take off and landing procedure.

Based on the above there is an important and immediate need for an assembly and/or associated systems for assuring that each of the pallets loaded within the cargo area of aircraft, or other vehicle or location, will be securely and reliably anchored in an intended location in a manner which will eliminate the possibility of the freight or cargo shifting or becoming inadvertently displaced from its intended position, regardless of the attitude or orientation of the aircraft, or other vehicle in which the freight supporting pallets are mounted. In addition, such an improved anchoring assembly and/or system should be capable of being adapted or modified so as to be used in combination with existing equipment presently used in the air transport industry thereby reducing the cost of the improved assembly and system and alleviating the need for a complete conversion of the anchoring and securing equipment presently being used. Also such an improved assembly and system could have as its primary purpose the efficient determination that each of the large number of locking assemblies utilized to secure the aforementioned freight pallet in their intended position are properly oriented in the locked position so as to securely anchor the pallet to the supporting platform within the aircraft by locking engagement and attachment to the track assembly associated therewith. Such an improved assembly and system should also be capable of clearly indicating the location of any one or more locking assembly which has inadvertently been allowed to remain in an unlocked position without the physical inspection of each and every one of the large number of locking assemblies typically utilized for the anchoring of a plurality of pallets to the supporting platform of tn aircraft or other vehicle.

SUMMARY OF THE INVENTION

The present invention is directed towards an assembly and an associated operative system for assuring that one or more freight carrying pallets are securely locked in an intended position on a supporting floor or other supporting structure. The invention is particularly, but not exclusively, adapted to securely attach the one or more pallets within the cargo or storage area of a commercial aircraft in a manner which allows for the clear determination that all of the pallets are locked in their intended position through utilization of a plurality of locking assemblies. Each of the locking assemblies includes substantially common structural features and comprises a part of both the assembly and operative system of the present invention. Accordingly, each of the locking assemblies is removably but securely attachable to one of a plurality of tracks, defining a track assembly, which are fixedly secured to the floor or other supporting platform within the aircraft. Further, each of the locking assemblies may be selectively oriented in either a locked position or an unlocked position. In the locked position, a plurality of locking members mounted to the locking assembly pass at least partially into the interior of the correspondingly disposed track. Concurrently, one or more retaining members are disposed into retaining engagement with peripheral portions of one or more adjacently disposed pallets.

As set forth, one potentially serious problem associated with the loading and securing of freight carrying pallets, in the manner described, is the possibility that one or more of the pallets may shift or move from their intended position during flight, including the associated take-off and landing procedures. Inadvertent shifting or detachment of the one or more pallets from the track assembly could possibly result in instability of the aircraft during flight, due to a resulting unequal distribution of weight within the storage area of the aircraft. Due to the large number of the aforementioned locking assemblies used to attach the plurality of pallets to the track assembly, it is not uncommon for one or more of the locking assemblies to inadvertently remain in an unlocked orientation. Therefore, while the referred to locking assembly may appear to be correctly positioned, it is not disposed in secured, interconnecting relation between the track assembly and the one or more pallets, which the locking assembly is intended to engage. Beginning the flight with one or more of the locking assemblies remaining in the unlocked position could, under current circumstances, be prevented only by having responsible personnel inspecting each and every one of the locking assemblies to ensure that it is in the required, locked position.

In order to overcome the above set forth problems, the assembly and operative system of the present invention is structured to assure that each of the locking assemblies, which are strategically disposed relative to the one or more pallets, are properly oriented in their locked position. Accordingly, the present invention includes a switching assembly comprising a plurality of switches, and preferably proximity type switches, disposed in spaced relation to one another and extending along each, or at least a majority of the plurality of tracks defining the track assembly. In addition, the switching assembly further comprises an activating member movably mounted on each of the plurality of locking assemblies. The activating member is cooperatively structured with each of the proximity switches such that when each of the locking assemblies are oriented in the locked position, the activating member associated therewith, moves into activating relation with a correspondingly disposed one of the proximity switches. The corresponding switch structure is thereby positioned into a circuit closed or other circuit activating position.

In addition to the above, an indicating assembly is preferably electrically coupled to the switching assembly and comprises a plurality of visual indicators, such as, but not limited to an incandescent bulb, light emitting diode (LED), or other visual indicators, which are responsive to the aforementioned circuit activating position. Further each of the plurality of visual indicators can be collectively disposed at a common location, such as on a control panel within the cargo area or alternatively within the cockpit of the aircraft. The location of the plurality of the visual indicators should facilitate clear and easy observation thereof by responsible personnel. Therefore, each of the locking assemblies, when disposed in the locked position, will have their location, relative to the track assembly, as well as the fact that they are oriented in the locked position, clearly indicated by an activation of the appropriate visual indicator corresponding to the location of each of the locking assemblies. Prior to takeoff, an inspection of the indicator assembly will allow for an effective determination that all of the locking assemblies are disposed in the required locked position, thereby assuring that the freight carrying pallets will not become dislodged during flight. However, in the unlikely event one or more locking assemblies becomes disconnected from the track assembly or are inadvertently disposed into the unlocked position, the indicator assembly could provide quick determination of which of the one or more locking assemblies has become inoperative. To this end, the indicator assembly may also include an emergency alarm indicator which may be visual, audible or both, such that immediate attention can be directed to the one or more locking assemblies which have become disconnected, either from the track assembly or from the one or more pallets with which they are associated.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective view of a locking assembly of the present invention shown in an unlocked position;

FIG. 2 is a detailed side view in partial cut-away of two retaining members associated with the locking assembly of the embodiment of FIG. 1, shown in retaining relation to adjacently positioned pallets, when the locking assembly is in the locked position;

Like reference numerals refer to like parts throughout the several views of the drawings.

DETAILED DESCRIPTION OF THE PREFERRED EMBODIMENT

As shown in the accompanying drawings, the present invention is directed towards an assembly and an associated system which assures that one or more freight supporting pallets are secured or anchored in locked attachment to a track assembly, which is incorporated in a floor, support platform or like supporting structure preferably, but not exclusively, of the type found in the cargo or storage area of commercial aircraft. As set forth above, the proper and safe operation of an aircraft during flight, including take off and landings, depends to a large extent on the stability of the aircraft. Proper stability is greatly enhanced when the weight or load carried by the aircraft is properly distributed throughout the intended portions of the aircraft. This is particularly true with aircraft which is specifically designed to carry freight or cargo on supporting pallets, within the cargo or storage area. It is imperative that once loaded, such freight supporting pallets do not shift or otherwise become detached and move from their intended, originally loaded position.

Figure 3:
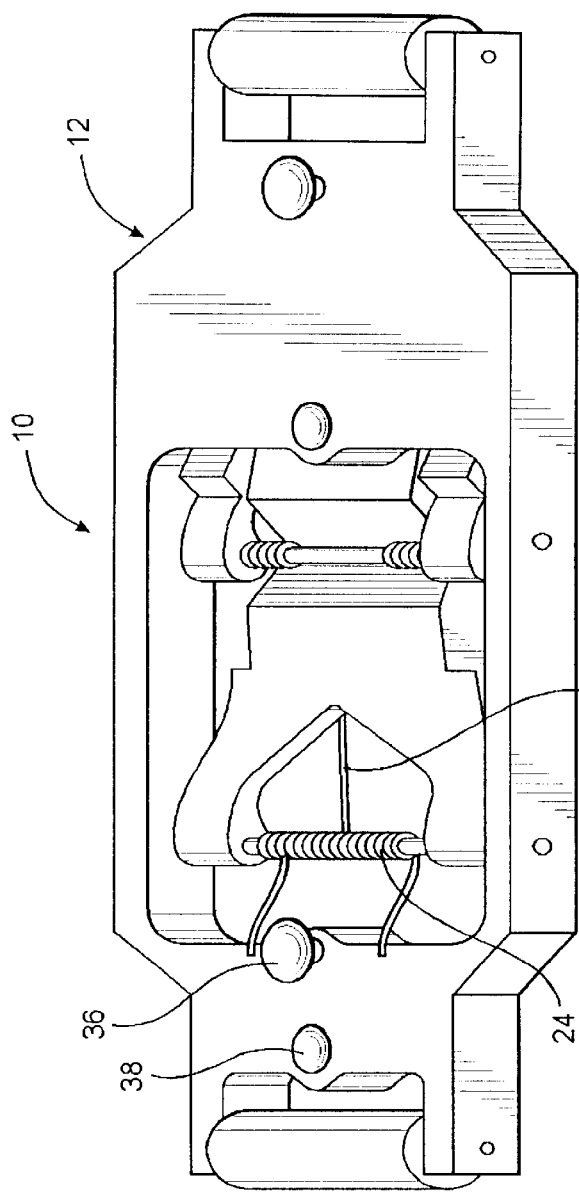
FIG. 3 is a perspective view of an underneath portion of the locking assembly of the embodiment of FIG. 1 showing a plurality of locking members disposed in an operative position for locked engagement with a track assembly.
Figure 4:
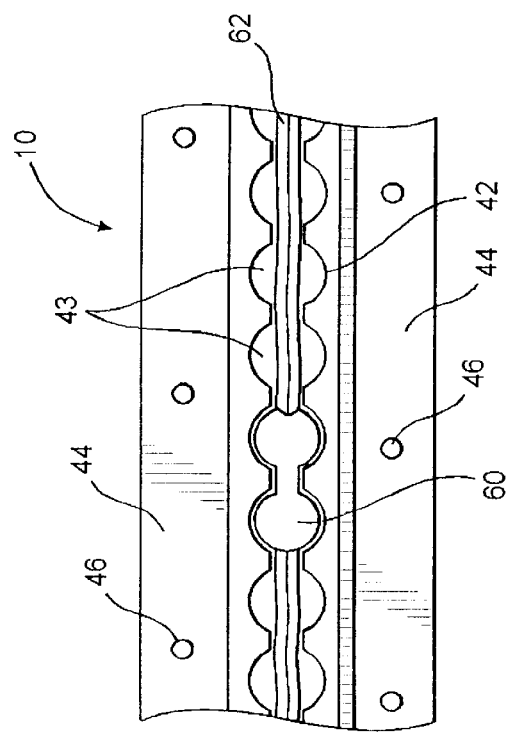
FIG. 4 is a top, perspective view in partial cut-away of one of a plurality of tracks of the track assembly of the present invention.

Accordingly, the present invention comprises a structurally modified locking assembly generally indicated as 10 and including a base 12 and oppositely disposed attachment rollers 14 and 16 rotationally mounted on opposite ends thereof and disposed and structured to secure cargo retaining straps to the locking assembly. With reference to FIGS. 1 through 3, the locking assembly 10 further includes two retaining members 18 and 20 which are pivotally or otherwise movably attached to the base 12 and are capable of being selectively oriented between an unlocked position, as shown in FIG. 1, and a locked position, it as at least partially demonstrated in FIG. 2. Each of the 17 retaining members 18 and 20 are interconnected to correspondingly disposed biasing springs 22 and 24, such that each of the retaining members 18 and 20 are normally biased to assume the locked position demonstrated in FIG. 2 and described in greater detail hereinafter. However, when in their unlocked position, the retaining members 18 and 20 are disposed in substantially overlying relation to one another and collectively assume a somewhat horizontal or "flat" orientation as they are both at least partially disposed within a central cavity 26 of the base 12. The aforementioned locked position of the locking assembly 10 is at least partially disclosed in FIG. 2, wherein each of the retaining members 18 and 20 extend angularly upward and outward from the central cavity 26 of base 12 into an orientation where they are disposed relatively transverse to one another. Further, the outermost ends of each of the retaining members 18 and 20 respectively include an engaging portion 18' and 20' which are disposed and configured to overlap and retain peripheral portions 30 and 32 of adjacently disposed pallets 34, schematically represented in FIG. 7. In addition, and with reference to FIG. 3, the orientation of each of the locking assemblies 10 in the locked positioned is further defined by a plurality of at least two locking members 36 and 38, each having their lowermost ends protruding outwardly from the under portion of the base 10. These locking members 36 and 38 are cooperatively structured with each of a plurality of tracks generally indicated as 40. More specifically, and as will be explained in greater detail hereinafter, each or at least most of the plurality of tracks 40 assume an elongated configuration having a central channel 42 formed therein and extending along the length thereof. Further, each of the tracks include longitudinal flanges 44 also extending along the length thereof and having connecting apertures as at 46 for attachment of the tracks to a floor, supporting surface or other supporting structure on which the plurality of pallets 34 are to be locked or anchored. Again with reference to FIG. 7, the floor or supporting structure or platform 48 is represented as being in the cargo or storage area 50 of an aircraft 52. As shown, the plurality of tracks 40 are disposed in substantially parallel, spaced relation to one another and extend along at least a portion of the length of the floor or support platform 48. Again with reference to FIG. 4, each of the tracks 40 include a plurality of openings 43 dimensioned and configured to receive the extremities or distal ends of the locking members 36 and 38 when the locking assembly is in the aforementioned locked position. By virtue of the cooperative structuring of the channel 42, openings 43 and locking members 36 and 38, the locking assembly 10 is removably locked to the track 40. At the same time, the retaining members 18 and 20 are disposed in overlapping, retaining engagement with the peripheral portions 30 and 32 of adjacently disposed pallets 34 thereby assuring that the pallets 34 will not become dislodged or shift during flight.

Figure 7:
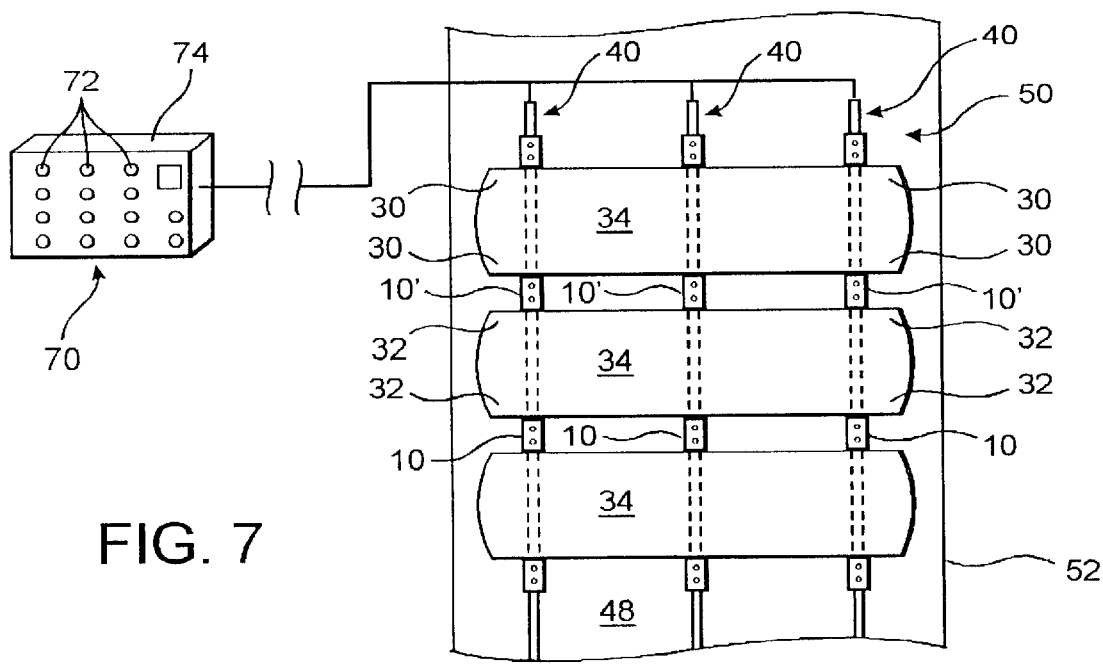
FIG. 7 is a schematic view of a track assembly and a plurality of pallets secured within the cargo area of an aircraft by a plurality of locking assemblies of the type shown in the embodiment of FIG. 1 and including an indicator assembly operatively connected to the track assembly.

When properly utilized, and as best shown in FIG. 7, a plurality of the locking assemblies 10 are connected to adjacent or predetermined spaced apart tracks 40 such that at least one of the retaining members 18 and 20 is disposed in overlapping retaining engagement with a corresponding peripheral portion 30 or 32 of at least one of the pallets 34. The locking assemblies 10' are disposed between adjacent pallets 34 such that both of the retaining members 18 and 20 are disposed in retaining engagement with the correspondingly disposed peripheral portions 30 and 32 of each of the adjacently disposed pallets 34.

Figure 5:
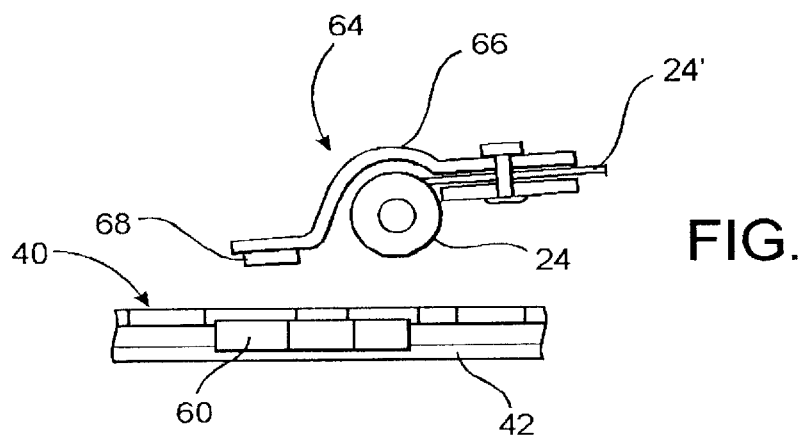
FIG. 5 is a schematic representation of a proximity switch mounted on the track assembly and an activating member mounted on each of the locking assemblies in a non-activating relation to a corresponding switch structure.
Figure 6:
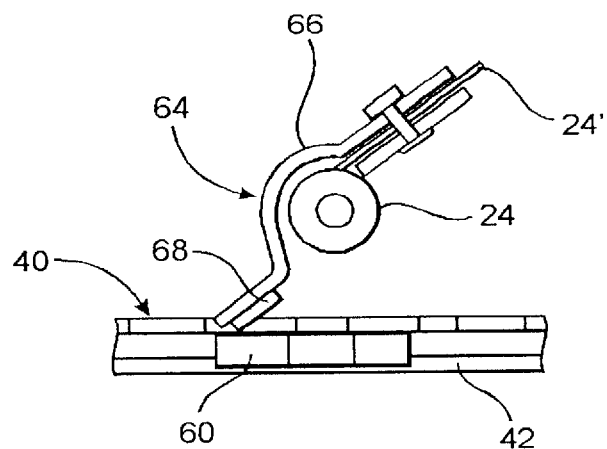
FIG. 6 is a schematic view of the embodiment of FIG. 5 wherein the activating member is in activating relation to a correspondingly disposed switch structure.

An important feature of the present invention is the structural modification of the locking assembly 10, as well as the track assembly, including each or a predetermined majority of the individual tracks 40. More specifically, the assembly and associated system of the present invention includes a switching assembly at least partially defined by a plurality of proximity switches 60 electrically coupled in spaced apart relation to one another by an elongated conductor 62. The plurality of proximity switches 60 collectively extend along almost the entire length of each of the tracks 40 and are disposed adjacent to the exterior of the track 40, through the aforementioned apertures 43. The switch assembly is also at least partially defined by a plurality of activating members generally indicated as 64 wherein at least one of the plurality of activating members 64 is movably mounted on each of the plurality of locking assemblies 10. More specifically, each of the activating members may include a connecting bracket or like structure 66, as well as an activating portion 68 which, in at least one embodiment of the present invention is in the form of a magnet. The activating member 64 is interconnected to and movable with at least one of the retaining members 20 as the retaining members move between the aforementioned locked and unlocked position. With reference to FIGS. 5 and 6, the one retaining member 20 to which the activating member 64 is connected is shown as being disposed in the unlocked and locked positions respectively. In FIG. 5 the activating portion 68 is disposed a sufficiently spaced apart distance from a correspondingly disposed proximity switch 60, so as to not activate the switch 60. Conversely, the activating member 64 as shown in FIG. 6 is oriented in activating relation to a corresponding one of the switches 60, when the one retaining member 20 is oriented in the locked position as partially disclosed in FIG. 2.

When in activating relation to a correspondingly disposed proximity switch 60, the switch 60 is forced into a circuit closed or other circuit activating position which serves to activate an indicator assembly generally indicated as 70 in FIG. 7. Specific structural details of the activating member 64, associated with each of the locking assemblies 10 includes an angularly configured bracket member 66 overlapping a coil portion of the biasing spring 24 and connected to an outwardly extending spring finger 24' which directly engages a portion of the retaining member 20, as also shown in FIG. 21. As set forth above the orientation of the one retaining member 20 between the unlocked position of FIG. 5 and the locked position of FIG. 6 serves to position the activating portion 68 sufficiently close to the proximity switch 60, so as to force it into the circuit activating position and thereby activate an appropriate indicator which is defined as part of the indicator assembly 70, to be described in greater detail hereinafter. In one embodiment of the present invention, each of the plurality of spaced apart switches 60 may be magnetic switches such that the positioning of the activating portion or magnet 68 in close proximity thereto serves to orient the magnetic switch 60 in the aforementioned circuit closed position.

As set forth above, the assembly and associated operative system of the present invention further includes an indicator assembly generally indicated as 70. The indicator assembly 70 is electrically coupled to the switch assembly defined by the plurality spaced apart proximity switches 60, extending along the length of each of at least the majority of tracks 40. It is noted that for the purposes of the present invention, electrically coupled may include a wired connection, a fiber optic connection, remote connection, such as via radio or other transmissions.

The indicator assembly 70 includes a plurality of preferably visual indicators 72 such as light emitting diodes (LED), a digital display, indicators on a computer screen or the like. Such visual indicators 72 may preferably be located at a common location or site, such as on a control panel 74. Further, the plurality of visual indicators 72 are preferably equal in number to the number of proximity switches 60 and are oriented such that the precise location of each of the plurality of switches 60 is indicated by the location of a corresponding visual indicator 72 on the control panel 74. Of course, it is recognized that a display wherein the visual indicators, such as a read out of a position and status, only arise when activated could also be provided, thereby providing a more compact control panel.

In operation, each of the one or more pallets 34 is properly oriented on the support platform or floor 48 within the storage area 50 of an aircraft 52 in a manner which assures proper weight distribution and accordingly proper stability of the aircraft during flight. Once properly positioned, a plurality of the locking assemblies 10 and 10' are oriented so as to engage the peripheral portions 30 and 32 of the pallets 34 as each of the locking assemblies 10 and 10' are oriented in their locked position. As discussed with reference to FIGS. 5 and 6, once the retaining members 18 and 20 are disposed in their locked position, the activating member 64 is oriented such that the activating portion or magnet 68 is close enough to a corresponding one of the plurality of spaced apart switches 60, thereby positioning the corresponding switch in a circuit closed or other activating position. Such circuit closed position will activate an appropriate one of the visual indicator 72, thereby assuring that each of the locking assemblies 10 and 10' are properly oriented in the locked position rather than being inadvertently allowed to remain in the unlocked position. Appropriately, the failure of any one of the visual indicators, representing the various locations of the plurality of switches 60, to be activated, will provide a clear indication that a correspondingly positioned locking assembly 10 is not properly oriented in the intended locked position.

It should be noted that the plurality of visual indicators 72 may be located other than at a common location, such as on a control panel 74, if more appropriate or applicable for a specific situation. Also, the control panel 74 may be located at other locations throughout the aircraft 52 such as in the cockpit or a remote facility such as in a control tower.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly structured to removably secure a pallet to a supporting surface, said assembly comprising:
    a) a track assembly including at least one elongated track secured to the supporting surface in adjacent relation to the pallet,
    b) a locking assembly removably securable to said track and selectively oriented in either a locked position or an unlocked position,
    c) said locked position defined by said locking assembly concurrently disposed in locked engagement with said track and retaining engagement with the pallet, and
    d) a switching assembly operatively associated with said locking assembly and structured to be indicative of said locking assembly being oriented in either said locked or unlocked position.

2. An assembly as recited in claim 1 further comprising an indicator assembly connected to said switching assembly and cooperatively structured therewith to indicate the orientation of said locking assembly in at least said locked position.

3. An assembly as recited in claim 1 further comprising an indicator assembly including a plurality of indicators each being operative to indicate a location of said locking assembly relative to said track assembly and the orientation of said locking assembly in said locked position.

4. An assembly as recited in claim 3 wherein each of said plurality of indicators comprises a visual indicator.

5. An assembly as recited in claim 4 wherein said plurality of indicators are collectively disposed at a common location.

6. An assembly as recited in claim 1 wherein said switch assembly comprises at least one switch structure mounted on said track and an activating member connected to said locking assembly and structured to orient said switch structure into a circuit closed position.

7. An assembly as recited in claim 6 wherein said switch structure comprises a magnetic switch and said activating member comprises a magnet.

8. An assembly as recited in claim 1 wherein said switching assembly comprises a plurality of switch structures mounted along the length of said track in spaced apart relation and at least one activating member movably mounted on said locking assembly and dispose! into activating relation with at least one of said switch structures when said locking assembly is oriented in said locked position.

9. An assembly as recited in claim 8 wherein each of said plurality of switch structures comprises a proximity switch disposable between a circuit open and a circuit closed position dependent on the location of said activating member relative thereto.

10. An assembly as recited in claim 9 wherein each of said plurality of switch structures comprises a magnetic switch and said activating member comprises a magnet.

11. An assembly as recited in claim 8 further comprising an indicator assembly connected to said switching assembly and cooperatively structured therewith to indicate the orientation of said locking assembly in said locked position and a location of said locking assembly relative to a correspondingly disposed one of said switch structures.

12. An assembly as recited in claim 1 wherein said locking assembly comprises a base including at least one locking member movably mounted thereon and at least one retaining member disposable into retaining engagement with an adjacently positioned pallet.

13. An assembly as recited in claim 12 wherein said locked position is defined by said locking member disposed in removably secured engagement with said track and said retaining member concurrently disposed in removable retaining engagement with the pallet.

14. An assembly as recited in claim 13 wherein said switching assembly comprises a plurality of switch structures mounted along the length of said track in spaced apart relation and an at least one activating member movably mounted on said locking assembly and disposed into activating relation with at least one of said switch structures when said locking assembly is oriented in said locked position.

15. An assembly as recited in claim 14 wherein said activating member is disposed into activating relation concurrently to operative disposition of said locking member and said retaining member into said locked position.

16. An assembly as recited in claim 15 wherein said activating member is interconnected to said retaining member and movable therewith and relative thereto on said base.

17. An assembly structured to removably secure a pallet to a supporting surface, said assembly comprising:
  a) a track assembly including a plurality of elongated tracks fixedly secured to the supporting surface in spaced relation to one another,
  b) a locking assembly removably securable to any of said plurality of tracks and selectively oriented in either a locked position or an unlocked position,
  c) said locked position defined by said locking assembly concurrently disposed in locked engagement with one of said tracks and retaining engagement with the pallet,
  d) a switching assembly operatively associated with said locking assembly and structured to be indicative of said locking assembly being oriented in either of said locked or unlocked positions,
  e) said switching assembly comprising a plurality of switch structures mounted along the length of at least some of said plurality of tracks in spaced apart relation, and
  f) said switching assembly further comprising at least one activating member movably mounted on said locking assembly and disposed into activating relation with at least one of said switch structures when said locking assembly is oriented in said locked position .

18. An assembly as recited in claim 17 further comprising an indicator assembly connected to said switching assembly and structured to indicate the location of said locking assembly relative to said the track assembly and said locking assembly being oriented into and out of said locked position.

19. An assembly as recited in claim 18 further comprising said indicator assembly including a plurality of visual indicators each being operative to indicate a different location of said locking assembly relative to said track assembly and the orientation of said locking assembly in at least said locked position.

20. An assembly as recited in claim 17 wherein each of said plurality of switch structures comprises a proximity switch disposable between an open and a closed position dependent on the location of said activating member relative thereto.

21. An assembly as recited in claim 20 wherein each of said plurality of switch structures comprises a magnetic switch and said activating member comprises a magnet.

22. An assembly as recited in claim 20 wherein said locking assembly comprises a base including a plurality of locking members movably mounted there on and at least two retaining members movably mounted on said base, at least one of said retaining members disposed into retaining engagement with an adjacently positioned pallet; said locked position defined by said locking members disposed in removably secured engagement with at least one of said tracks and each of said retaining members concurrently disposed in removable retaining engagement with adjacently positioned pallets.

23. An assembly as recited in claim 22 wherein said activating member is interconnected to one of said retaining members and movable therewith into activating relation with a corresponding one of said switch structures.

24. A system for securing a plurality of pallets to a supporting surface within a cargo area of an aircraft, said system comprising:
  a) a plurality of elongated tracks fixedly secured to the supporting surface in underlying at least partially supporting relation to the pallets,
  c) a plurality of locking assemblies each removably securable to any one of said plurality of tracks and selectively oriented into an out of a locked positioned;
  d) said locked position of each of said locking assemblies at least partially define; by concurrent disposition in locked engagement with one of said plurality of tracks and retaining engagement with at least one pallet, e) a switching assembly operatively associated with said plurality of locking assemblies, and f) said switching assembly structured to indicate the location of each of said plurality of locking assemblies relative to said plurality of tracks and the orientation thereof into said locked position.

25. A system as recited in claim 24 wherein said switching assembly comprises a plurality of proximity switches mounted along the length of at least some of said plurality of tracks in spaced apart relation and at least one activating member movably mounted on each of said locking assemblies and disposed into activating relation with at least one of said switches when said locking assembly is oriented in said locked position.

26. A system as in claim 24 further comprising an indicator assembly including a plurality of visual indicators each being operative to indicate a different location of said locking assemblies relative to said track assembly and the orientation of said locking assemblies in at least said locked position.

27. A system as recited in claim 26 wherein said plurality of indicators are collectively disposed in a common location.

28. A system as recited in claim 25 wherein each of said plurality of proximity switches is disposable between an open and a closed position dependent on the location of said at least one activating member relative thereto.

29. A system as recited in claim 24 wherein each of said locking assemblies includes a plurality of locking members mounted thereon and at least two retaining members disposable into retaining engagement with adjacently positioned pallets; said locked position being defined by said locking members disposed in removably secured engagement with one of said plurality of tracks and each of said retaining members concurrently disposed in removably retaining engagement with adjacent ones of the pallets.

30. A system as recited in claim 29 wherein an activating member is interconnected to at least one of said retaining members, said activating member being disposed into an activating relation concurrently to an operative disposition of said locking members and each of said retaining members into said locked position.

* * * * *